US012602147B2

(12) United States Patent
Agrawal et al.

(10) Patent No.: US 12,602,147 B2
(45) Date of Patent: Apr. 14, 2026

(54) ZOOM ACTION BASED IMAGE PRESENTATION

(71) Applicant: INTERNATIONAL BUSINESS MACHINES CORPORATION, Armonk, NY (US)

(72) Inventors: Tushar Agrawal, West Fargo, ND (US); Jeremy R. Fox, Georgetown, TX (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 17/664,710

(22) Filed: May 24, 2022

(65) Prior Publication Data

US 2023/0384917 A1     Nov. 30, 2023

(51) Int. Cl.
   *G06F 3/04845*     (2022.01)
   *G06F 3/0488*     (2022.01)

(52) U.S. Cl.
   CPC ........ *G06F 3/04845* (2013.01); *G06F 3/0488* (2013.01); *G06F 2203/04806* (2013.01)

(58) Field of Classification Search
   CPC .... G06F 1/1686; G06F 1/1694; G06F 3/0481; G06F 2200/1637; G06F 2203/04806
   USPC ........................................................ 345/418
   See application file for complete search history.

(56) References Cited

U.S. PATENT DOCUMENTS

| | | | |
|---|---|---|---|
| 9,342,862 B2 * | 5/2016 | Cristescu | ................. G06T 3/40 |
| 10,628,931 B1 | 4/2020 | Ramos | |
| 10,922,793 B2 | 2/2021 | Baek | |
| 11,222,415 B2 | 1/2022 | Ozcan | |
| 2019/0138030 A1 * | 5/2019 | Wu | ................. G06K 19/06037 |
| 2019/0156120 A1 * | 5/2019 | Lorenzo | ............. G06F 3/04815 |
| 2019/0327413 A1 * | 10/2019 | Lorenzo | ................. G06T 17/05 |
| 2021/0166807 A1 * | 6/2021 | Quennesson | .......... G16H 10/60 |
| 2022/0343834 A1 * | 10/2022 | Fischer | ................... G09G 5/10 |

FOREIGN PATENT DOCUMENTS

| | | |
|---|---|---|
| CN | 110415194 A | 11/2019 |
| CN | 111091151 | 11/2021 |

OTHER PUBLICATIONS

Ehrenfeucht A, Rozenberg G. Standard and ordered zoom structures. Theoretical Computer Science. Dec. 10, 2015;608:4-15.*
De Luca F, Hossain I, Gray K, Kobourov S, Borner K. Multi-level tree based approach for interactive graph visualization with semantic zoom. arXiv preprint arXiv:1906.05996. Jun. 14, 2019.*

(Continued)

*Primary Examiner* — Phu K Nguyen
(74) *Attorney, Agent, or Firm* — James L. Olsen

(57) ABSTRACT

Aspects of the present disclosure relate to zoom action based image presentation. A zoom action on a first image can be received on a user device, the zoom action defined by a set of zoom action parameters. The first image can be analyzed to determine image properties of the first image. A second image depicting a different structural level of the first image can be searched for based on the zoom action parameters of the zoom action and the image properties of the first image. The second image can be presented to the user as a response to the received zoom action.

17 Claims, 7 Drawing Sheets

(56)          References Cited

OTHER PUBLICATIONS

Martins R, Lourenco N, Horta N. Laygen II—Automatic layout generation of analog integrated circuits. IEEE Transactions on Computer-Aided Design of Integrated Circuits and Systems. Oct. 16, 2013;32(11):1641-54.*

Chen L, Fang Z, Fu Y. Consistency-Aware Map Generation at Multiple Zoom Levels Using Aerial Image. IEEE Journal of Selected Topics in Applied Earth Observations and Remote Sensing. Apr. 27, 2022;15:5953-66.*

Kuperstein I, Cohen DP, Pook S, Viara E, Calzone L, Barillot E, Zinovyev A. NaviCell: a web-based environment for navigation, curation and maintenance of large molecular interaction maps. BMC systems biology. Dec. 2013;7:1-3.*

Gibin M, Singleton A, Milton R, Mateos P, Longley P. An exploratory cartographic visualisation of London through the Google Maps API. Applied Spatial Analysis and Policy. Jul. 2008;1:85-97.*

Kuperstein I, Bonnet E, Nguyen HA, Cohen D, Viara E, Grieco L, Fourquet S, Calzone L, Russo C, Kondratova M, Dutreix M. Atlas of Cancer Signalling Network: a systems biology resource for integrative analysis of cancer data with Google Maps. Oncogenesis. Jul. 2015;4(7):e160.*

Hudson-Smith A, Batty M, Crooks A, Milton R. Mapping for the masses: Accessing Web 2.0 through crowdsourcing. Social science computer review. Nov. 2009;27(4):524-38.*

Jahanian A, Chai L, Isola P. On the"steerability" of generative adversarial networks. InInternational Conference on Learning Representations Sep. 25, 2019.*

Alicioglu G, Sun B. A survey of visual analytics for explainable artificial intelligence methods. Computers & Graphics. Feb. 1, 2022; 102:502-20.*

Lukac R, Martin K, Platanoitis KN. Digital camera zooming based on unified CFA image processing steps. IEEE Transactions on Consumer Electronics. Feb. 2004;50(1):15-24.*

Fatima N. AI in photography: scrutinizing implementation of super-resolution techniques in photo-editors. In2020 35th International Conference on Image and Vision Computing New Zealand (IVCNZ) Nov. 25, 2020 (pp. 1-6). IEEE.*

Greg Heinrich, Photo Editing with Generative Adversarial Networks (Parts 1 & 2), .2017. https://developer.nvidia.com/blog/photo-editing-generative-adversarial-networks-1/ and https://developer.nvidia.com/blog/photo-editing-generative-adversarial-networks-2/.*

BMW Group IBM, "Gaining Control Over Software Quality With IBM Software", Downloaded Mar. 29, 2022, 5 PGS, <https://www.ibm.com/case-studies/d421912w54680d62>.

Lei.,"Generative Adversarial Network Technology: AI Goes Mainstream", Servers & Storage, Downloaded Mar. 29, 2022, 7 PGS,, <https://www.ibm.com/blogs/systems/generative adversarial-network-technology-ai-goes-mainstream/>.

Mell et al., "The NIST Definition of Cloud Computing", National Institute of Standards and Technology, Special Publication 800-145, Sep. 2011, 7 pages.

Mitra et al., "A Generative Approach to Visualizing Satellite Data," 2021 IEEE International Conference on Cluster Computing (CLUSTER), IEEE, 2021, DOI: 10.1109/Cluster 48925.2021.00079, 2 PGS.

* cited by examiner

COMPUTER SYSTEM
501

ZOOM ACTION BASED IMAGE PRESENTATION

BACKGROUND

The present disclosure relates generally to the field of computing, and in particular, to zoom action based image presentation.

On electronic devices, users can perform zoom actions (e.g., digital zooms) to see more or less detail displayed on their screen. Zooming in can make pixels within an image on the display (or a portion that the zoom action is executed on) appear closer, resulting in image quality loss. Zooming out can make pixels within an image on the display appear farther away, which can be limited based on the original image resolution. Digital image processing techniques can be performed to enhance and enlarge images, preserving image quality during zoom actions. Zoom actions can be performed on images, graphical user interfaces, application windows, multimedia objects, and other electronically displayed features.

SUMMARY

Embodiments of the present disclosure are directed to a method, system, and computer program product for zoom action based image presentation. A zoom action on a first image can be received on a user device, the zoom action defined by a set of zoom action parameters. The first image can be analyzed to determine image properties of the first image. A second image depicting a different structural level of the first image can be searched for based on the zoom action parameters of the zoom action and the image properties of the first image. The second image can be presented to the user as a response to the received zoom action.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
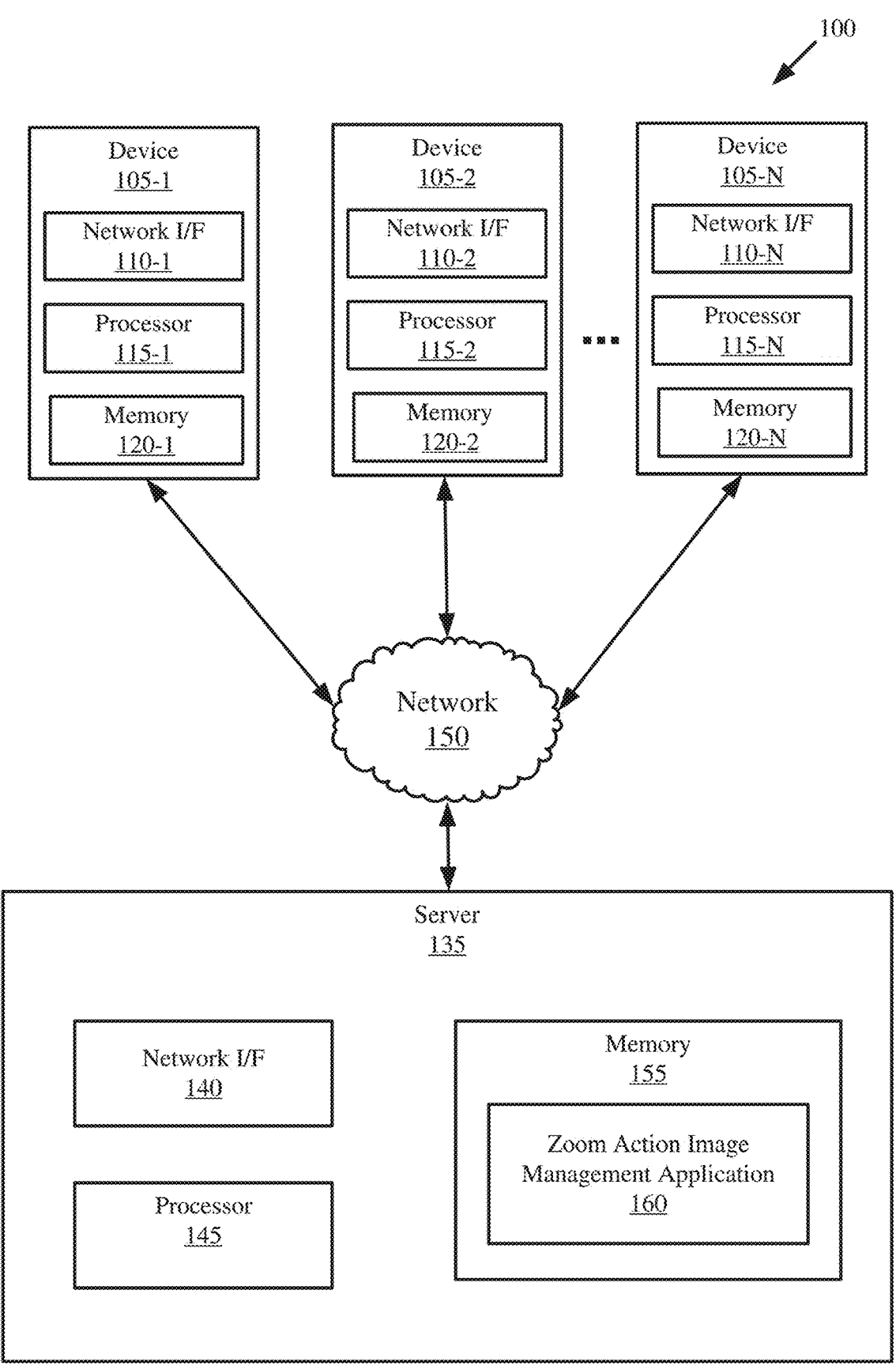
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and in particular, to zoom action based image presentation. While the present disclosure is not necessarily limited to such applications, various aspects of the disclosure can be appreciated through a discussion of various examples using this context.

On electronic devices, users can perform zoom actions (e.g., digital zooms) to see more or less detail displayed on their screen. Zooming in can make pixels within an image on the display (or a portion of the display which the zoom action is executed on) of an electronic device appear closer, resulting in image quality loss. Zooming out can make pixels within an image on the display appear farther away, which can be limited based on the original image resolution. Zoom actions can be performed on images, graphical user interfaces, application windows, multimedia objects, and other electronically displayed features.

When zooming in or out on an image, when digital image processing (e.g., image scaling/enhancement) is not used, image resolution is maintained. That is, the same number of pixels are displayed, and zooming merely changes the viewing angle (e.g., perceived distance) of the displayed image with respect to the user. This can lead to image quality loss and limitations on the amount of zooming that can be performed (e.g., based on the original image resolution). However, when image scaling, image enhancement, and/or other digital image processing techniques are used, clarity of the image can be enhanced (e.g., by adding more pixels or otherwise editing the image). When performing a zoom action on an image where digital processing techniques are used, more pixels can be dynamically added to the image, allowing for more detailed views during zoom actions.

Though zoom actions can be improved via digital processing techniques, zoom actions merely depict a plain view of the image from different magnification levels. Currently, zoom actions do not change the viewed structural level/granularity of an object. It would be beneficial to present images depicting structurally different views of objects responsive to performed zoom actions. For example, users can learn more about objects within images by exploring the internal features/components of the objects (e.g., structurally "lower" levels) or external surroundings/systems of objects (e.g., structurally "higher" levels) using zoom actions.

As discussed herein, different "structural levels" relate to viewed levels of organization/hierarchies of objects. As an example, for a human body, the highest "structural level" can be the entire human (e.g., the organismic level), which can have lower structural levels of: systems (e.g., systemic levels such as the digestive system, cardiovascular system, muscular system, etc.), organs (e.g., heart, liver, eyes, etc.), tissues (e.g., muscle tissues), cells (e.g., brain cells, muscle cells, etc.), macromolecules (e.g., proteins), small molecules (e.g., water molecules), atoms (e.g., oxygen and hydrogen), and subatomic particles (e.g., electrons, protons, and neutrons). As another example, for a computer system, the highest "structural level" may be the entire computer system (e.g., the monitor, computer, input/output devices, etc.), where lower levels specify components included within each component of the computer system. For example, the computer itself can be broken down into an internal level (e.g., a lower structural level) comprising a central processing unit (CPU), graphics card, fans, memory, storage, a power supply, etc. Each of these components can be further broken down into additional components down to, for example, the material level (e.g., semiconductor materials used within electronic circuits) and beyond. Thus, different structural levels refer to different levels of granularity or abstraction which objects can be viewed under (e.g., the physical level versus the microscopic level versus the chemical level versus the subatomic level, etc.).

Aspects of the present disclosure relate to zoom action based image presentation. A zoom action on a first image can be received on a user device, the zoom action defined by a set of zoom action parameters. The first image can be analyzed to determine image properties of the first image. A second image depicting a different structural level of the first image can be searched for based on the zoom action parameters of the zoom action and the image properties of the first image. The second image can be presented to the user as a response to the received zoom action.

Aspects of the present disclosure provide various improvements over conventional zoom technology. By presenting different structural views corresponding to different objects within images in response to zoom actions, users can explore various features of objects that may not be visible within an original image. Thus, aspects of the present disclosure can be used as a powerful education tool, allowing users to explore various structural levels of objects within images. Further, users can explore different structural levels of objects within images without requiring manual/external searching. For example, a user can learn about objects within an image without having to conduct an internet search or query on the desired structural levels they wish to explore. Rather, images can be presented in response to received zoom actions automatically and intelligently using aspects of the present disclosure. Further still, by implementing various machine learning algorithms to generate/present the images depicting the different structural views, computing efficiency of the zoom action based image presentation is enhanced. For example, the computing resources necessary for retrieving an image as a response to a zoom action can be lessened as the models are trained to more efficiently perform.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera), and/or any commercially available or custom software (e.g., browser software, communications software, server software, natural language processing software, search engine and/or web crawling software, image processing software, extended reality (XR) software, etc.). The devices 105 and/or the server 135 can be servers, desktops, laptops, financial transaction terminals, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 6.

The server 135 includes a zoom action image management application 160. The zoom action image management application 160 can be configured to present images depicting particular views (e.g., different structural levels or granularities of objects within images) in response to and based on zoom actions received from users.

The zoom action image management application 160 can be configured to receive a zoom action on an image from a user. The zoom action can be a zoom-in or zoom-out action. A zoom-in action refers to a zoom action where the image viewing angle is brought closer to a user (i.e., magnified from the user's perspective in some manner). A zoom-out action refers to a zoom action where the image viewing angle is distanced from a user. Any suitable type of user command can specify the particular type (e.g., zoom-in vs. zoom-out) and magnitude (e.g., the level of zoom-in or zoom-out) of a requested zoom action. For example, a user can issue a zoom action via a touch screen (e.g., via a pinch/spread command received on a touch screen), a mouse (e.g., a scroll-wheel command), a keyboard (e.g., using a key function to zoom), a voice command, or any other suitable input mechanism. A location of the zoom action (e.g., pixel coordinates or other location information within the image where the zoom action is executed) can also be indicated based on the executed zoom action.

As discussed herein, "zoom action parameters" are data associated with a zoom action that define the zoom action. The zoom action parameters can specify the type of zoom action (e.g., zoom-in vs. zoom-out), the magnitude of the zoom action (e.g., requested magnification level), and the location of the zoom action within the image. Zoom action parameters can be user-defined based on the executed zoom action.

Upon receiving the zoom action on the image from the user, the zoom action image management application 160 can be configured to analyze the image to determine properties of the image. Determining image properties can include determining colors of the image, determining the resolution of the image, determining objects present within the image (e.g., via object detection), determining boundaries/edges within the image (e.g., via artificial intelligence (AI) techniques), determining text displayed within the image (e.g., via text recognition), and determining other useful information about the image. Thus, the originally viewed image which the zoom action was executed on can be analyzed by the zoom action image management application 160 to determine properties of the image. Image properties can be used when performing subsequent operations for presenting images depicting different structural levels based on received zoom actions on original images.

The zoom action image management application 160 then searches for a second image depicting a different structural level of the original image based on the received zoom action parameters and the determined image properties. The search can consider the type of zoom action performed by the user (zoom-in vs. zoom-out), the magnitude of zoom action performed by the user (e.g., the level of zoom in or out), the location within the image (e.g., a detected object within the image) the zoom action was executed on, and the determined image properties (e.g., colors, edges, text, etc. within the original image). For example, assuming a user executed a zoom-in action on a car hood depicted in an original image, searched images can include internal views of cars (e.g., views of car engines). As another example, if a user executed a zoom-in action on an eye within an image of a human, searched images can include cellular level depictions of eyes (e.g., views depicting various cellular structures within the eye, such as rods and cones). Ultimately, the zoom action image management application 160 searches for a second image depicting a different structural level of the original image based on the zoom action parameters (e.g., zoom type, zoom magnitude, and zoom location) and original image properties (e.g., recognized objects, text, etc.).

In embodiments, the search performed by the zoom action image management application 160 can return multiple candidate images depicting different structural levels of the original image. In embodiments, a best candidate image can be selected from the candidate images returned from the search. In some embodiments, the best candidate image can be manually selected by a user. For example, the multiple candidates returned from the search can be presented to the user allowing the user to select (e.g., on a graphical user interface (GUI)) the best candidate image depicting the desired structural level. In some embodiments, the best candidate image can be automatically selected by the zoom action image management system 160. For example, selection criteria based on zoom action parameters and/or image properties can be defined and the best candidate image can be selected based on the observed zoom action parameters and the original image properties. As an example, assuming a user executed a zoom action on an image depicting a particular make, model, and color of car, a best candidate searched image may mirror the make, model, and color of the car. That is, the selection criteria for a best candidate image can depend on the image properties (e.g., a matching number of image properties) and zoom parameters.

In embodiments, the selected image (e.g., best candidate image) can be presented to the user in response to the zoom action. For example, upon selecting the second image depicting the different structural level of the original image, the second image depicting the different structural level can be presented to the user as a response to the received zoom action.

In some embodiments, the zoom action image management application 160 can be configured to modify the selected image (e.g., second image or best candidate image returned from the search) to generate a new image (e.g., a third image or generated image). The second image can be modified using the first image properties such that the newly generated third image more closely mirrors the original image that the zoom action was executed on. The zoom action image management application 160 can modify the selected image such that it includes attributes (e.g., colors, dimensions, components, or other features) corresponding to the originally viewed image. As an example, following the example above where a user executed a zoom-in action executed on an eye within an original image, the second image depicting the cellular level of the eye can be adapted based on the color of the eye in the originally viewed image. For example, if the color of the iris within the originally viewed image is blue, then the color of rod structures within the cellular depiction of the eye in the selected second image can be modified to be blue.

The selected second image can be modified to generate the third image in any suitable manner. In some embodiments, an artificial intelligence (AI) algorithm is configured to modify the second image to generate the third image using the first image properties. For example, a generative adversarial network (GAN) model can be configured to generate the third image by modifying the second image using the first image properties. A GAN is a type of machine learning framework where a discriminator model (e.g., a first neural network) and a generator model (e.g., a second neural network) can be cooperatively coupled to learn in an unsupervised manner. The discriminator can be configured to determine whether an input (e.g., an image generated by the generator) is real or fabricated, and a generator can be configured to attempt to "fool" the discriminator by generating input data (e.g., fabricated images) for the discriminator. In the context of the present disclosure, the generator component of the GAN can be configured to generate the third image by modifying the second image using the first image properties, and the discriminator component of the GAN can be configured to determine whether the generated third image is sufficiently realistic (e.g., whether the generated third image meets data criteria defining that the third image is sufficiently realistic). However, any other suitable type of machine learning model can be implemented to generate the third image.

Machine learning algorithms can be used for image property analysis (e.g., object detection, text recognition, edge detection, color analysis), for searching for a second image depicting a different structural level of an originally viewed image, for selecting a best candidate image from a candidate image set, and for generating a third image by modifying the selected second image using the original image properties. Machine learning algorithms can include but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The functionalities performed by the zoom action image management application 160 can allow users to see a variety of structural levels associated with objects within images. Further, the appearance of the presented images at structurally different levels can share characteristics (e.g., colors, shapes, sizes, etc.) with the originally viewed image that the zoom action was executed on, providing immersivity. This can be used as a powerful educational tool, allowing users to gain knowledge on various structural levels of objects depicted within images. In embodiments, the zoom action image management application 160 can store a plurality of different structural level views associated with an originally viewed image, and allow the user to traverse through the different structural level views associated with the image based on received zoom actions.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Though this disclosure pertains to the collection of personal data (e.g., image data), it is noted that in embodiments, users opt-in to the system (e.g., zoom action image management application 160). In doing so, they are informed of what data is collected and how it will be used, that any collected personal data may be encrypted while being used, that users can opt-out at any time, and that if they opt-out, any personal data of the user is deleted.

Figure 2:
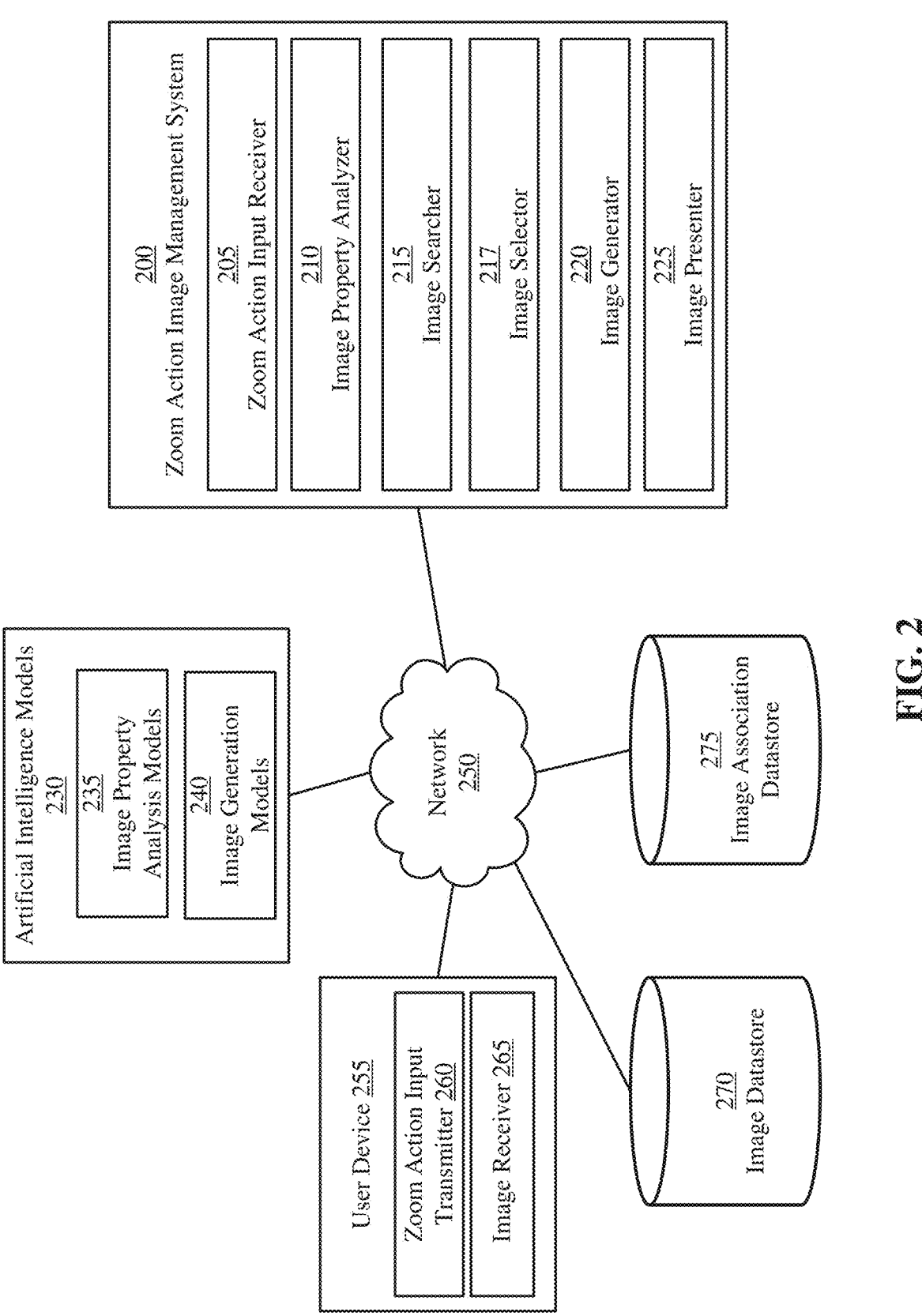
FIG. 2 is a block diagram illustrating an IoT environment, in accordance with embodiments of the present disclosure.

Referring now to FIG. 2, illustrated is a block diagram of an example Internet of Things (IoT) environment according to aspects of the present disclosure. The IoT environment can include numerous components communicatively coupled by a network 250, such as, but not limited to, a zoom action image management system 200, artificial intelligence (AI) models 230, a user device 255, an image datastore 270, and an image association datastore 275. The various components within the IoT environment can be processor executable instructions that can be executed by a dedicated or shared processor using received inputs.

The zoom action image management system 200 can be configured to present images depicting particular views (e.g., structural levels, abstraction levels, granularities, etc.) in response to and based on zoom actions received from users. The zoom action image management system 200 includes a zoom action input receiver 205, an image property analyzer 210, an image searcher 215, an image selector 217, an image generator 220, and an image presenter 225. The functions of the zoom action input receiver 205, image property analyzer 210, image searcher 215, image selector 217, image generator 220, and image presenter 225 can be processor executable instructions that can be executed by a dedicated or shared processor using received inputs.

The zoom action input receiver 205 can be configured to receive an indication of a zoom action being executed on an image (e.g., an original image, a starting image, a first image) from a user. The zoom action can be executed using any suitable command from any suitable input source. The executed command (e.g., zoom action) can specify zoom action parameters associated with the zoom action. A variety of commands can be implemented to specify zoom action parameters defining a zoom action executed on an image. For example, touch commands (e.g., pinch/spread), mouse commands (e.g., click/scroll/pan), keyboard commands (e.g., key function), voice commands, in-air commands (e.g., gesture-based commands), or other commands can be executed to specify a particular type of zoom action to be performed (e.g., zoom-in vs. zoom-out), a magnitude of zoom action to be performed (e.g., 50% zoom level versus 100% zoom level), and a location the zoom action is executed on (e.g., pixel coordination within an image that the zoom action is executed on).

The zoom action input receiver 205 can receive the indication of the executed zoom action from a zoom action input transmitter 260 of a user device 255. That is, upon a zoom action being executed on the user device 255 via zoom action input transmitter 260, parameters of the zoom action are obtained by the zoom action input receiver 205. Though reference is made to a zoom action being executed on user device 255, zoom actions can be received from any other suitable device.

The image property analyzer 210 can be configured to analyze properties of the original image the zoom action was executed on. A variety of image analysis techniques can be used to obtain a variety of image properties. The image analysis techniques can be machine executed scripts (e.g., code) defining image analysis steps to be performed (e.g., by a processor) based on received inputs (e.g., input images)

and/or image property analysis models 235 within AI models 230. The image property analysis models 235 can be trained (e.g., via supervised or unsupervised learning) to perform a variety of functions, including color analysis, pattern recognition, resolution analysis, object recognition, edge detection, text recognition, and feature detection, among other techniques. Example machine learning algorithms that can be used to analyze image properties are discussed above with respect to FIG. 1, though reference will be made to additional methods below. In embodiments, images searched by the image searcher 215, images selected by the image selector 217, and/or images generated by the image generator 220 can also have their properties analyzed by the image property analyzer 210.

In embodiments, the image property analyzer 210 can use color analysis techniques to determine color information associated with images and portions thereof. Color analysis techniques can be performed on images to determine red, green, blue, (RGB) and/or hue, saturation, value (HSV) histograms. That is, various colors, frequencies, and locations of respective colors (collectively color data) can be output for images. The color data can be used for searching and selecting images depicting different structural levels of objects based on a received zoom action. In embodiments, the color analysis technique(s) can be machine executed scripts (e.g., code) or artificial intelligence models 230 (e.g., a portion of image property analysis models 235) configured to output color data of the input image.

In embodiments, the image property analyzer 210 can use object detection techniques to determine object identities within images. Image property analysis models 235 that can be used by the image property analyzer 210 to perform object detection on an image include scale-invariant feature transform (SIFT), histogram of oriented gradients (HOG) features, Viola-Jones object detection, region-based convolutional neural networks (R-CNNs), Single Shot MultiBox Detector (SSD), You Only Look Once (YOLO), Retina-Net, deformable convolutional networks, and other approaches. The output of the object detection algorithm can include one or more identified objects (e.g., identified via bounding boxes) with corresponding labels. Thus, the image property analyzer 210 can output a set of detected or identified objects. The objects detected by the image property analysis models 235 can be used to search for and/or select images depicting different structural levels of objects within an original image.

In embodiments, an object (of a set of detected objects) that the zoom action was executed on within the original image can be determined upon performing the object detection. For example, the location of the zoom action indicated in the zoom action parameters can be compared to the location of the detected object to determine that the zoom action was executed on the detected object.

In embodiments, the image property analyzer 210 can use edge detection, pattern detection, resolution detection, feature detection, and other algorithms to determine image properties. Ultimately, the determined image properties (e.g., identified objects, determined, colors, recognized text, etc.) can be used by the image searcher 215 to search for images depicting different structural levels of the original input image, by the image selector 217 to select an image from multiple candidate images returned from the image searcher 215, and by the image generator 220 to generate images by modifying the image selected by the image selector 217 using the original image properties.

The image searcher 215 searches for a second image depicting a different structural level of the original input image the zoom action was executed on based on the zoom action parameters and the original image properties. In embodiments, the image searcher 215 scans through image datastore 270 to find candidate images that depict different structural levels of the original input image. The scan can consider the zoom action parameters such as the type of zoom action, magnitude of zoom action, and location of zoom action. The scan can further consider image properties associated with the zoom action, such as an identified object within the image the zoom action was executed on (e.g., as indicated by the location of the zoom action within zoom parameters), the color of an object the zoom action was executed on, the dimensions of the object the zoom action was executed on, etc. Thereafter, the image searcher 215 can return one or more candidate images depicting different structural levels of the original image.

In some embodiments, the image presenter 225 can present an image returned from the search performed by the image searcher 215 to the user as a response to the zoom action. However, in embodiments, further processing can be performed to select a best candidate image of a candidate image set for presentation to the user and/or to modify a searched image (e.g., the best candidate image) based on the original image properties to generate a new image for presentation to the user.

The image selector 217 can select a best candidate image of one or more candidate images returned from the image searcher 215. The image selector 217 can select the best candidate image via manual input (e.g., received from user device 255) or automatically. Manual selection can include receiving an input signal from a user indicating the selection. For example, the candidate image set (e.g., the one or more candidates returned from the image searcher 215) can be presented to a user (e.g., via a list, grid, slide show, or other format) on a graphical user interface (GUI) allowing the user to manually rank, indicate preference, or otherwise select the best candidate image depicting the structurally different level of the original image.

Automatic selection can include ranking the candidate images within the candidate image set based on the zoom action parameters and the original image properties. For example, the candidate images can be ranked based on a number of matching properties (e.g., matching colors, dimensions, aesthetic features, product types, etc.) between the searched image and the original image. For example, if an original image depicted a computer within a room, and a searched image candidate was an internal view of the computer, determining a rank for the searched image can consider a comparison of components between the images (e.g., a brand/manufacturer of the computer), a comparison of color between the images (e.g., whether the computer cases are the same color), a comparison of dimensions between the computers within the images (e.g., whether the computer cases are similar dimensions), etc. A higher number of matching properties between a searched image depicting a different structure view and an original image can result in a higher rank for the selected image. In embodiments, a highest ranked image can be selected as the best candidate image. Thus, aspects of the present disclosure recognize that selection criteria for selecting a best candidate image of multiple candidate images can consider a comparison between properties of the original image and the searched image.

In embodiments, the candidate images can be ranked based on the parameters of zoom action. For example, if the zoom action executed by a user was a zoom-in action executed with a 50% desired magnification level on an object within the image, then images depicting the object one structural level down may be higher ranked than images depicting the object two or more structural levels down or images depicting the object at structurally higher levels. For example, if the above-referenced zoom action was executed on the head of a human depicted in an image, relatively higher ranked images may be images depicting the brain at an organ level (e.g., depicting the full brain), and relatively lower ranked images may be images depicting individual sections of the brain (e.g., the cerebellum, frontal lobe, temporal lobe, etc.) and images depicting lower levels of the brain such as neuron structure (e.g., cell body, dendrites, axon, myelin sheath, etc.). Thus, aspects of the present disclosure recognize that selection criteria for selecting a best candidate image of multiple candidate image can consider zoom action parameters.

The image generator 220 can be configured to modify the selected searched image based on properties of the original image. The selected image can be modified to include one or more properties (e.g., colors, dimensions, components, aesthetic features, etc.) of the original input image. In embodiments, image generation models 240 can be configured to automatically generate a new image by modifying the selected searched image using attributes of the original image. Image generation models 240 can include any suitable number and/or type of machine learning algorithms configured to generate a new image by modifying the selected searched image using the original image properties. In embodiments, the image generation models 240 can be trained in an unsupervised, semi-supervised, or supervised manner. That is, in some embodiments, input data can be provided to the image generation models 240 specifying labels of objects within real images (e.g., as opposed to fabricated images), enabling the image generation models 240 to learn features associated with various objects. Thus, the image generation models 240 can utilize the learned features to generate new images.

In some embodiments, image generation models 240 can learn in an unsupervised or semi-supervised manner, such as by utilizing a GAN. As discussed above, a GAN is a type of machine learning framework where a discriminator model (e.g., a first neural network) and a generator model (e.g., a second neural network) can be cooperatively coupled to learn in an unsupervised manner. The discriminator can be configured to determine whether an input (e.g., an image generated by the generator) is real or fabricated, and a generator can be configured to attempt to "fool" the discriminator by generating input data (e.g., fabricated images) for the discriminator. In the context of the present disclosure, the generator component of the GAN can be configured to generate the third image by modifying the second image using the first image properties, and the discriminator component of the GAN can be configured to determine whether the generated third image is sufficiently realistic (e.g., whether the generated third image meets data criteria defining that the third image is sufficiently realistic). In embodiments, further parameters/criteria can be defined such that the generated image contains a desired number of properties of the original image. Though reference is made to utilizing a GAN to generate a new image depicting a structurally different level of the original image by modifying a selected second image based on the first image properties, any other suitable type of machine learning model can be implemented to generate the third image.

The image presenter 225 can be configured to present an image depicting a structurally different view of the original image as a response to the received zoom action. The image presenter 225 can present one or more images searched by the image searcher 215, selected by the image selector 217, and/or generated by the image generator 220 to an image receiver 265 of user device 255. The image can then be displayed to the user on user device 255 in response to the received zoom action.

In embodiments where multiple images are identified, selected, and/or generated based on zoom actions executed on an original image, the images depicting different structural views of the original image can be stored within image associated datastore 275. A sequence of the images can be stored based on their corresponding structural levels and associated zoom action mappings. As an example, a sequence stored in the image association datastore 275 can include an originally viewed image, a second image depicting a second structural level of the originally viewed image for a first range of zoom action parameters (e.g., zoom-in from magnification level 25-100% for a first object), a third image depicting a third structural level of the originally viewed image for a second range of zoom action parameters (e.g., zoom-in from magnification levels 100-200% for the first object), and a fourth image depicting a fourth structural level of the originally viewed image for a third range of zoom action parameters (e.g., a zoom-in from magnification levels 200-300% for the first object). If, in the future, a user executes a zoom action that has parameters that correspond to an image stored in image association datastore 275, then that image can be presented to the user as a response to the zoom action. Following the example above, if the user executed a zoom-in action with a magnification level of 250% on the first object within the original image, then the fourth image depicting the fourth structural level of the originally viewed image can be presented to the user as a response to the zoom action.

Figure 4:
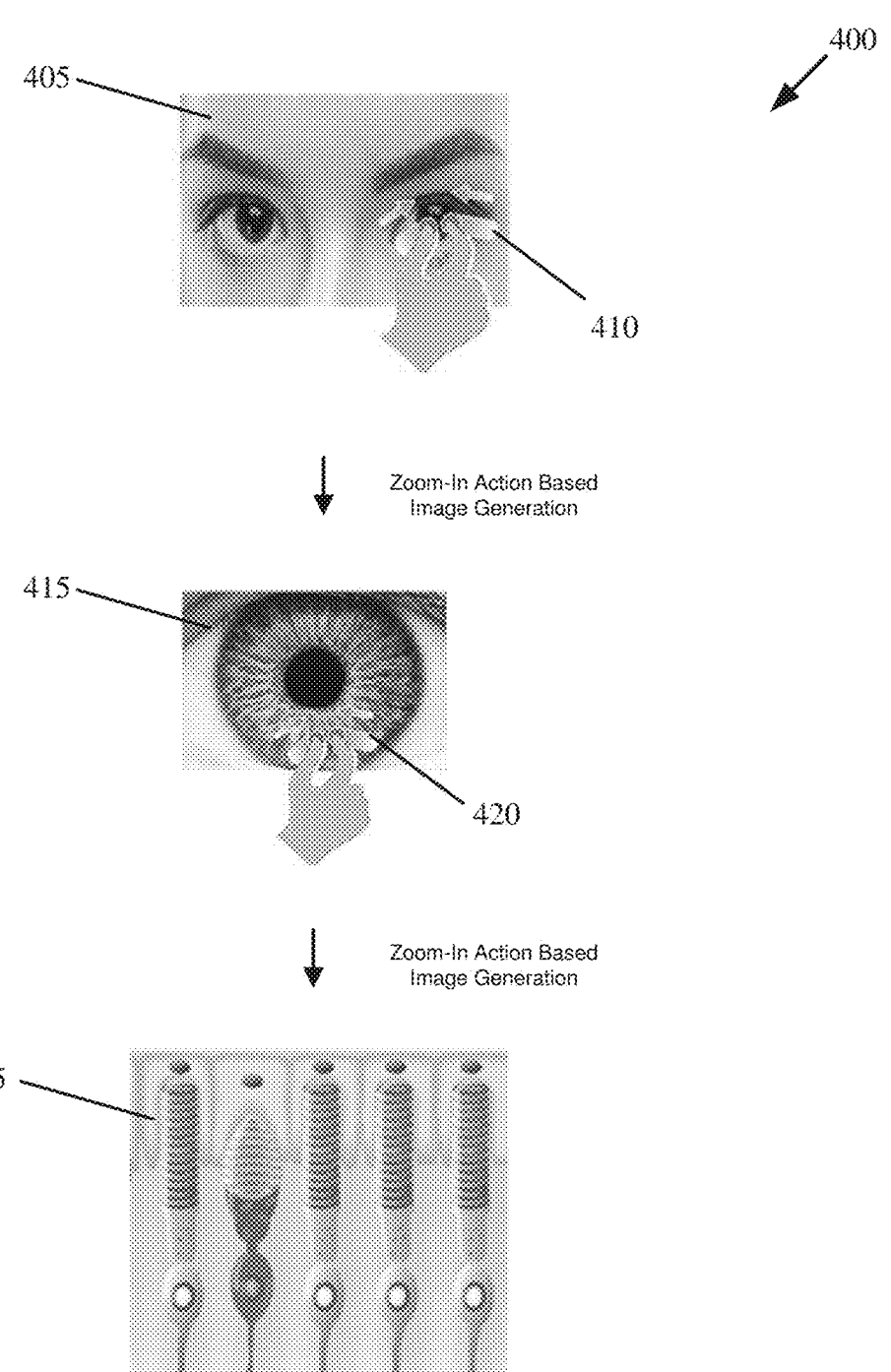
FIG. 4 is a diagram illustrating a sequence of images that can be explored by a user using zoom actions, in accordance with embodiments of the present disclosure.

In embodiments, multiple image sequences can be stored for different objects within an original image. For example, the above-referenced image sequence having the originally viewed image, second image depicting the second structural level, third image depicting the third structural level, and fourth image depicting the fourth structural level may only correspond to a first object. Additional image sequences can be stored for each respective object of a plurality of additional objects within the original image. An example image sequence 400 that may be stored within image association datastore 275 is depicted in FIG. 4.

It is noted that FIG. 2 is intended to depict the representative major components of example computing environment. In some embodiments, however, individual components can have greater or lesser complexity than as represented in FIG. 2, components other than or in addition to those shown in FIG. 2 can be present, and the number, type, and configuration of such components can vary.

Figure 3:
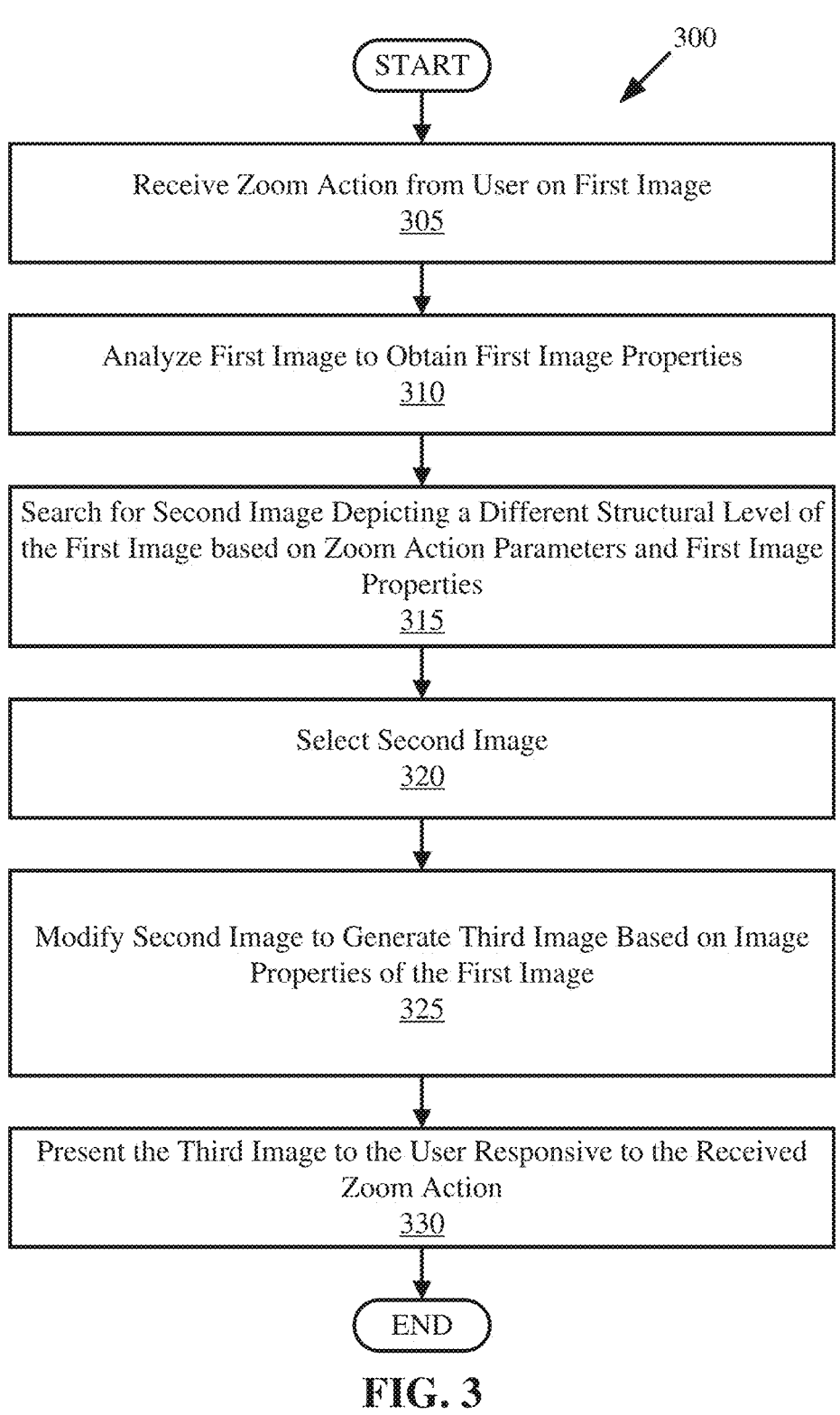
FIG. 3 is a flow-diagram illustrating an example method for zoom action based image presentation, in accordance with embodiments of the present disclosure.

Referring now to FIG. 3, shown is a flow-diagram illustrating an example method 300 for presenting images to users in response to received zoom actions, in accordance with embodiments of the present disclosure. One or more operations of method 300 can be completed by one or more computing devices (e.g., devices 105, server 135, zoom action image management system 200, user device 255, and AI models 230).

Method 300 initiates at operation 305, where a zoom action is received on a first image from a user. The zoom action can be the same as, or substantially similar to, zoom actions described with respect to the zoom action input receiver 205 of FIG. 2. For example, the zoom action can be defined by zoom action parameters specifying the type of zoom action, the magnitude of zoom action, and the location of zoom action within the first image.

The first image is then analyzed to obtain image properties of the first image. This is illustrated at operation 310. Determining image properties can be completed in the same, or a substantially similar manner, as described with respect to the image property analyzer 210 of FIG. 2. For example, determining image properties can include determining color within images, determining resolutions of images, detecting/ identifying objects within images, detecting edges/patterns/ features within images, recognizing text with images, etc.

A second image depicting a different structural level of the first image is then searched for based on the zoom action parameters and the first image properties. This is illustrated at operation 315. Searching for the second image can be completed in the same, or a substantially similar manner, as described with respect to the image searcher 215 of FIG. 2. For example, an image datastore can be scanned for candidate images depicting the different structural level of the first image based on the original image properties and the zoom action parameters. In embodiments, searching for the second image can return a list of candidate images. In some embodiments, an image returned from the search at operation 315 can be returned to the user as a response to the zoom action (e.g., and operations 320-330 can be skipped).

A second image is then selected. This is illustrated at operation 320. Selecting the second image can be completed in the same, or a substantially similar manner, as described with respect to the image selector 217 of FIG. 2. In embodiments where only a single image is returned from the search, the single image can be selected as the second image by default. In embodiments where multiple candidate images are returned from the search, then automatic or manual selection can be performed to select the second image from the candidate image set. In some embodiments, an image selected at operation 320 can be returned to the user as a response to the zoom action (e.g., and operations 325-330 can be skipped).

The second image is then modified to generate a third image based on the image properties of the first image. This is illustrated at operation 325. Generating the third image by modifying the second image using the first image properties can be completed in the same, or a substantially similar manner, as described with respect to the image generator 220 of FIG. 2. For example, in embodiments, a GAN can be used to generate the third image by modifying the second image using the first image attributes. However, any other suitable manner for generating the third image can be implemented without departing from the spirit and scope of the present disclosure.

The third image is then presented to the user as a response to the received zoom action. This is illustrated at operation 330. In embodiments, the third image can be stored within an image associated datastore (e.g., image association datastore 275) for a corresponding image sequence based on an object the zoom was executed on within the first image and based on the zoom action parameters.

The aforementioned operations can be completed in any order and are not limited to those described. Additionally, some, all, or none of the aforementioned operations can be completed, while still remaining within the spirit and scope of the present disclosure.

Referring now to FIG. 4, shown is an example image sequence 400 which can be generated/stored using aspects of the present disclosure. As shown in FIG. 4, a user may execute a first zoom-in action on an eye (e.g., a first object) depicted in an original image 405 (e.g., a first image 405).

In response to the first zoom-in action 410 and based on the parameters of the first zoom-in action 410 and the attributes of the original image 405, a second image 415 depicting a different structural level (e.g., the organ level) can be presented to the user. The second image 415 can be generated/ presented in accordance with aspects of the present disclosure. That is, the second image 415 may be a modified version of a searched/selected image that includes properties of the original image 405. As an example, if the iris color within the original image is blue, then the second image 415 may be modified to include the same, or a substantially similar, eye color.

A second zoom-in action 420 is then performed on the iris (e.g., a second object) within the second image 415. In response to the second zoom-in action 420 and based on the parameters of the second zoom-in action 420 and the properties of the second image 415, a third image 425 depicting a different structural level (e.g., the cellular level) can be presented to the user. The third image 425 can be generated/ presented in accordance with aspects of the present disclosure. That is, the third image 425 may be a modified version of a searched/selected image that includes properties of the second image 415. Following the example above, because the iris color within the second image 415 is blue, then the third image 425 may be modified such that a color of the cones within the cellular structure level are depicted as blue.

Though reference is made to an example image sequence 400 for a human eye, a variety of different image sequences can be stored for different objects within images. Zoom based image presentation can be completed for a variety of objects, including, but not limited to: electronic devices/ components, biological features/species, materials (e.g., lattice structures of compounds), and other physical objects (e.g., musical instruments, power tools, etc.).

Figure 5:
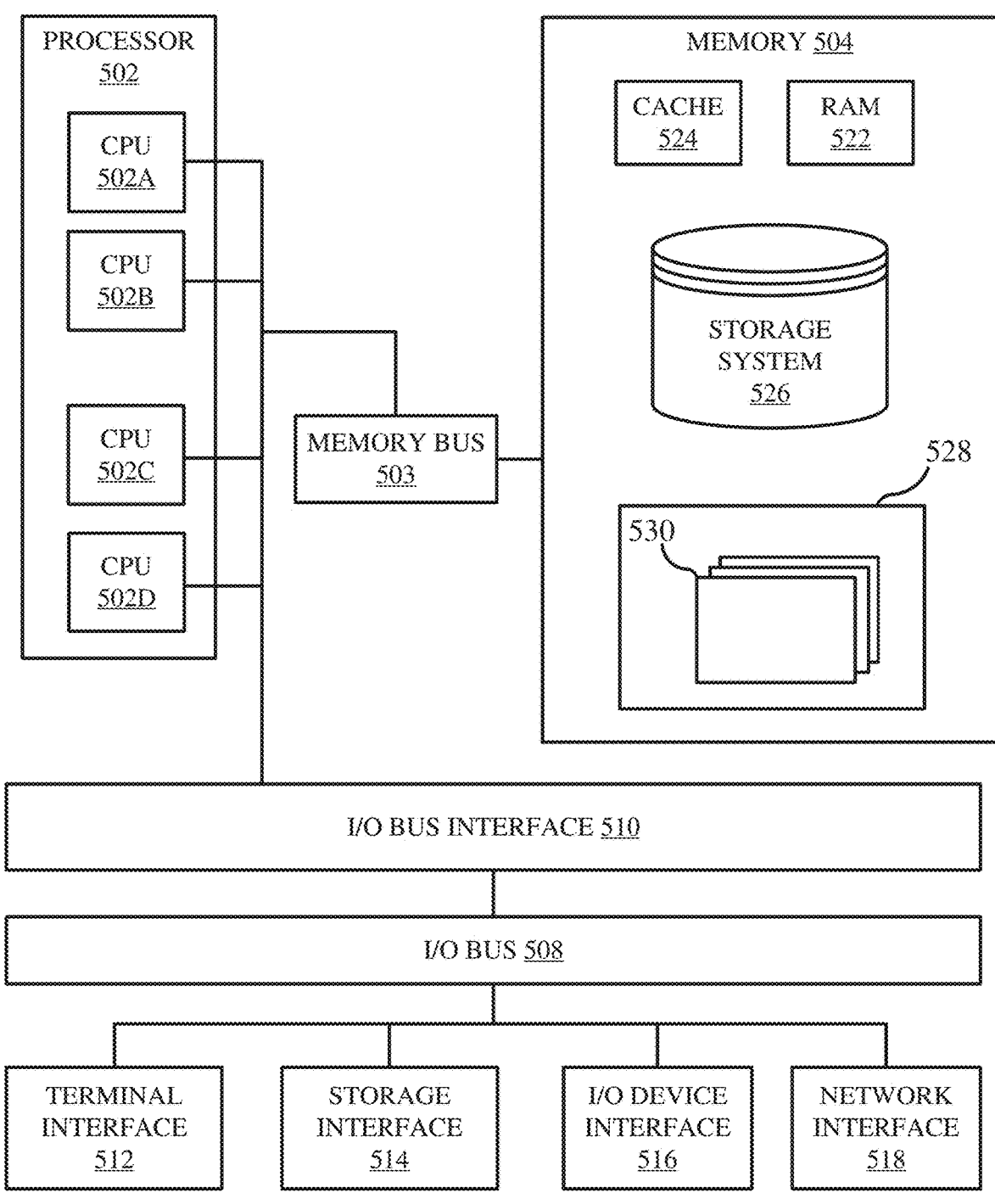
FIG. 5 is a high-level block diagram illustrating an example computer system that can be used in implementing one or more of the methods, tools, modules, and any related functions described herein, in accordance with embodiments of the present disclosure.

Referring now to FIG. 5, shown is a high-level block diagram of an example computer system 501 that may be utilized in various devices discussed herein (e.g., devices 105, server 135, zoom action image management system 200, user device 255, and AI models 230) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502 (also referred to as processors herein), a memory 504, a terminal interface 512, a storage interface 514, an I/O (Input/Output) device interface 516, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

Memory 504 may include computer system readable media in the form of volatile memory, such as random-access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
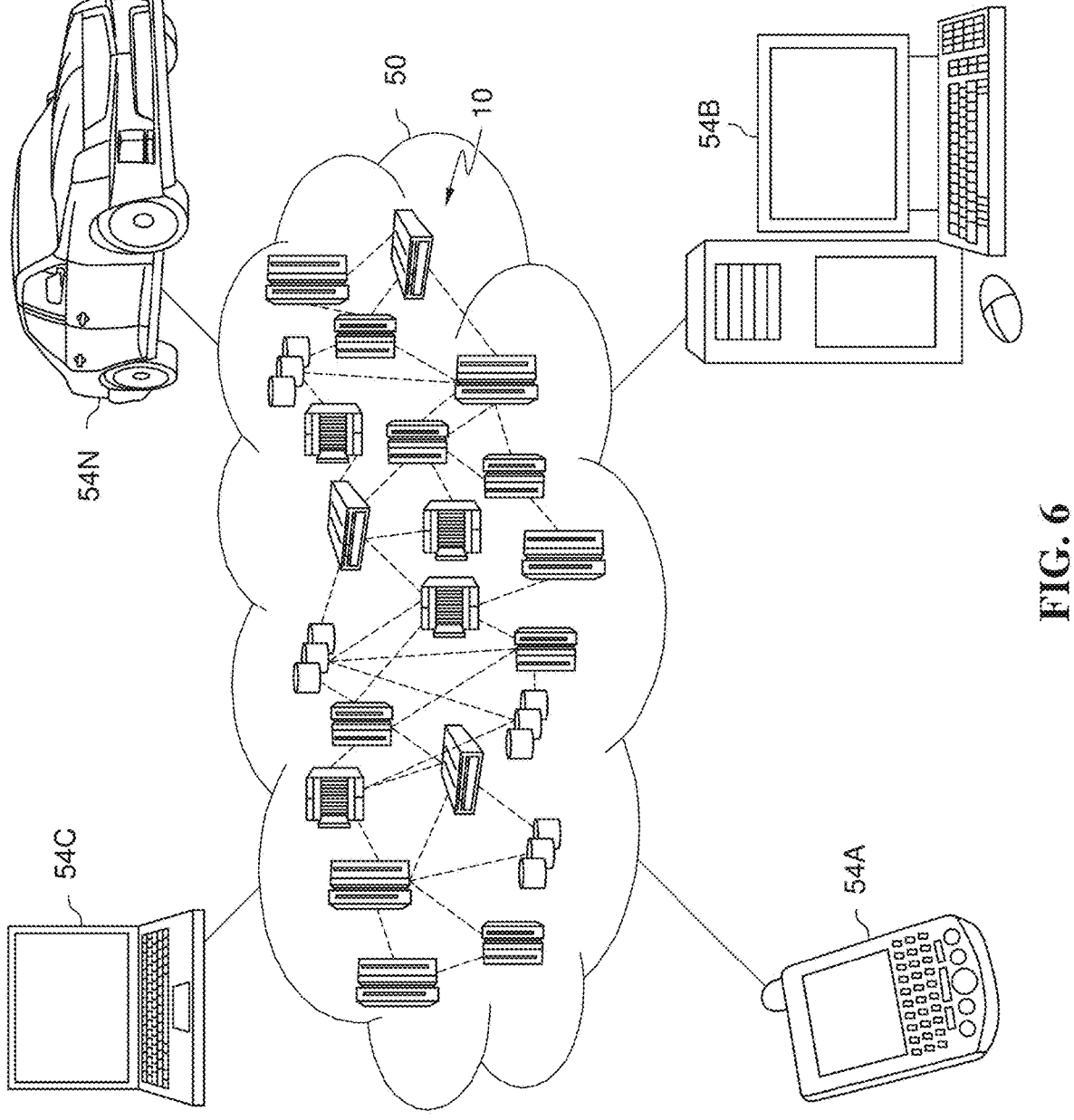
FIG. 6 is a diagram illustrating a cloud computing environment, in accordance with embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
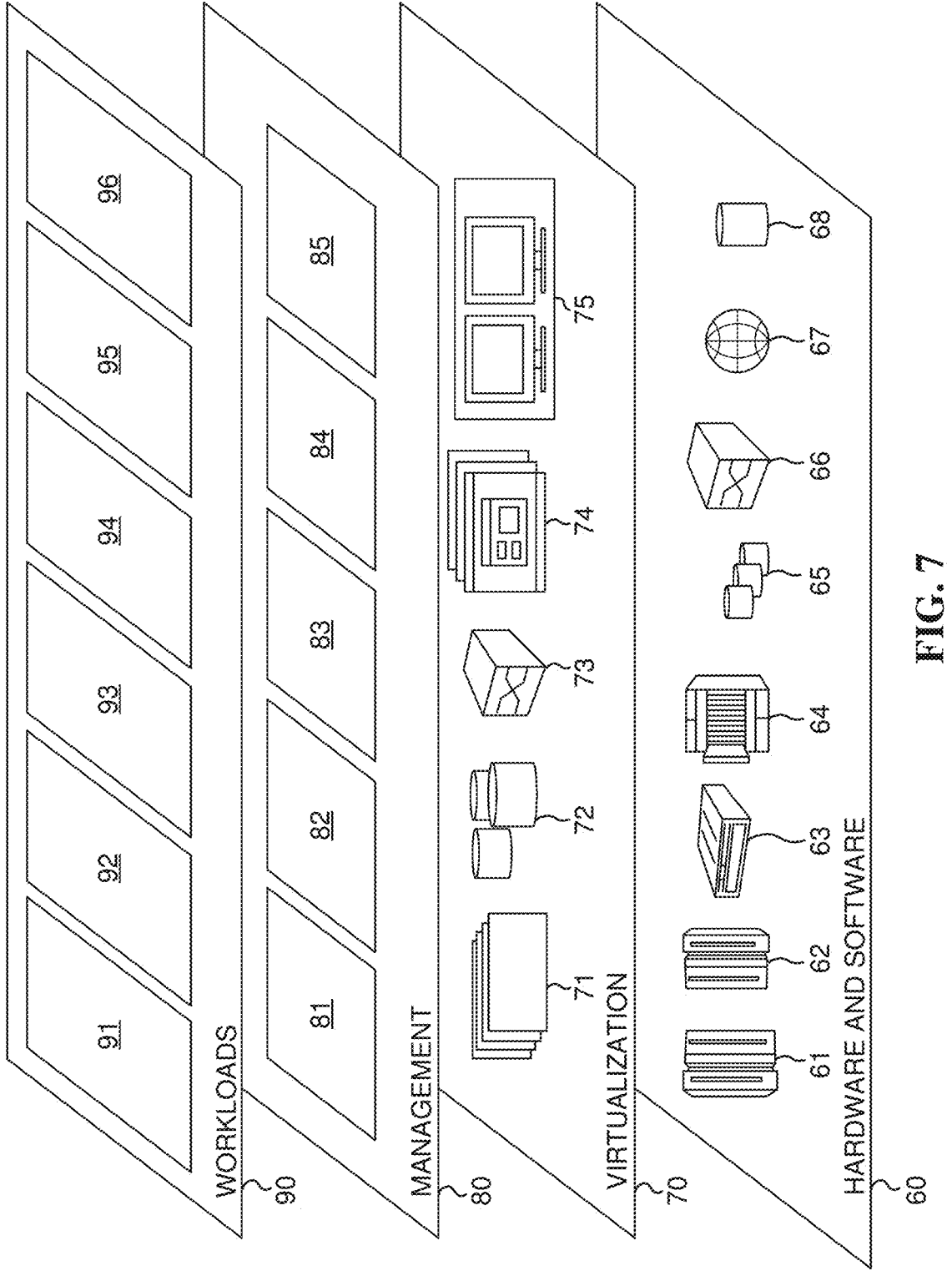
FIG. 7 is a block diagram illustrating abstraction model layers, in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and zoom action based image management 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
receiving, on a user device, a zoom action on a first image, the zoom action defined by a set of zoom action parameters;
analyzing, responsive to receiving the zoom action, the first image to determine image properties of the first image;
searching, within an image datastore, for a second image depicting a different structural level of the first image based on the zoom action parameters of the zoom action and the image properties of the first image;
modifying the second image to generate a third image based on the image properties of the first image; and
presenting the third image to the user as a response to the received zoom action.

2. The method of claim 1, wherein the second image is selected from a plurality of candidate images within the image datastore.

3. The method of claim 1, wherein the second image is modified to generate the third image using a generative adversarial network (GAN).

4. The method of claim 1, wherein the zoom action parameters include a type of zoom action, a magnitude of zoom action, and a location of zoom action within the first image.

5. The method of claim 4, wherein determining image properties of the first image includes:
determining a set of objects within the first image; and
determining color data associated with the first image.

6. The method of claim 5, wherein the second image is searched for using an object of the set of objects within the first image where the zoom action was executed as indicated by the location of the zoom action.

7. A system comprising:
one or more processors; and
one or more computer-readable storage media collectively storing program instructions which, when executed by the one or more processors, are configured to cause the one or more processors to perform a method comprising:

receiving, on a user device, a zoom action on a first image, the zoom action defined by a set of zoom action parameters;
analyzing, responsive to receiving the zoom action, the first image to determine image properties of the first image;
searching, within an image datastore, for a second image depicting a different structural level of the first image based on the zoom action parameters of the zoom action and the image properties of the first image;
modifying the second image to generate a third image based on the image properties of the first image; and
presenting the third image to the user as a response to the received zoom action.

8. The system of claim 7, wherein the second image is selected from a plurality of candidate images within the image datastore.

9. The system of claim 7, wherein the second image is modified to generate the third image using a generative adversarial network (GAN).

10. The system of claim 7, wherein the zoom action parameters include a type of zoom action, a magnitude of zoom action, and a location of zoom action within the first image.

11. The system of claim 7, wherein determining image properties of the first image includes:
determining a set of objects within the first image; and
determining color data associated with the first image.

12. The system of claim 11, wherein the second image is searched for using an object of the set of objects within the first image where the zoom action was executed as indicated by a location of the zoom action.

13. A computer program product comprising one or more computer readable storage media, and program instructions collectively stored on the one or more computer readable storage media, the program instructions comprising instructions configured to cause one or more processors to perform a method comprising:
receiving, on a user device, a zoom action on a first image, the zoom action defined by a set of zoom action parameters;
analyzing, responsive to receiving the zoom action, the first image to determine image properties of the first image;
searching, within an image datastore, for a second image depicting a different structural level of the first image based on the zoom action parameters of the zoom action and the image properties of the first image;
modifying the second image to generate a third image based on the image properties of the first image; and
presenting the third image to the user as a response to the received zoom action.

14. The computer program product of claim 13, wherein the second image is selected from a plurality of candidate images within the image datastore.

15. The computer program product of claim 13, wherein the second image is modified to generate the third image using a generative adversarial network (GAN).

16. The computer program product of claim 13, wherein determining image properties of the first image includes:
determining a set of objects within the first image; and
determining color data associated with the first image.

17. The computer program product of claim 16, wherein the second image is searched for using an object of the set of objects within the first image where the zoom action was executed as indicated by a location of the zoom action.

<div align="center">

\* \* \* \* \*

</div>